(12) United States Patent
Applefeld

(10) Patent No.: US 8,606,645 B1
(45) Date of Patent: Dec. 10, 2013

(54) METHOD, MEDIUM, AND SYSTEM FOR AN AUGMENTED REALITY RETAIL APPLICATION

(75) Inventor: Neal Applefeld, Bexley, OH (US)

(73) Assignee: SeeMore Interactive, Inc., Bexley, OH (US)

( * ) Notice: Subject to any disclaimer, the term of this patent is extended or adjusted under 35 U.S.C. 154(b) by 0 days.

(21) Appl. No.: 13/364,708

(22) Filed: Feb. 2, 2012

(51) Int. Cl.
*G06Q 30/00* (2012.01)

(52) U.S. Cl.
USPC ...................................... 705/26.1; 705/14.25

(58) Field of Classification Search
USPC .................. 705/26.1, 27.1, 14.1, 14.23, 14.25
See application file for complete search history.

(56) References Cited

U.S. PATENT DOCUMENTS

| | | | |
|---|---|---|---|
| 6,084,590 A | 7/2000 | Robotham et al. | 345/419 |
| 7,050,078 B2 | 5/2006 | Dempski | 345/700 |
| 7,502,759 B2 | 3/2009 | Hannigan et al. | 705/51 |
| 7,564,469 B2 * | 7/2009 | Cohen | 345/632 |
| 7,593,783 B2 | 9/2009 | Fernandez | 700/132 |
| 7,639,387 B2 | 12/2009 | Hull et al. | 358/1.18 |
| 7,672,543 B2 | 3/2010 | Hull et al. | 382/305 |
| 7,750,926 B2 | 7/2010 | Lonsing | 345/633 |
| 7,898,563 B2 | 3/2011 | Park | 348/14.01 |
| 7,946,492 B2 | 5/2011 | Rohs | 235/462.08 |
| 7,991,220 B2 | 8/2011 | Nagai et al. | 382/154 |
| 8,199,966 B2 * | 6/2012 | Guven et al. | 382/100 |
| 2005/0131776 A1 * | 6/2005 | Perotti et al. | 705/27 |
| 2006/0038833 A1 * | 2/2006 | Mallinson et al. | 345/633 |
| 2008/0071559 A1 * | 3/2008 | Arrasvuori | 705/1 |
| 2009/0244097 A1 * | 10/2009 | Estevez | 345/633 |
| 2009/0285483 A1 * | 11/2009 | Guven et al. | 382/181 |
| 2010/0030578 A1 * | 2/2010 | Siddique et al. | 705/3 |
| 2010/0241475 A1 * | 9/2010 | Eglen et al. | 705/7 |
| 2011/0055049 A1 * | 3/2011 | Harper et al. | 705/27.1 |
| 2011/0148924 A1 | 6/2011 | Tapley et al. | 345/634 |
| 2012/0022924 A1 * | 1/2012 | Runnels et al. | 705/14.4 |
| 2012/0239513 A1 * | 9/2012 | Oliver et al. | 705/14.73 |
| 2012/0284122 A1 * | 11/2012 | Brandis | 705/14.64 |

OTHER PUBLICATIONS

Feb. 17, 2010—http://activeden.net/item/product-box-3d-showcase-extended-xml/87373.*
Lu, Yuzhu "Augmented reality e-commerce assistant system: trying while shopping." Human-Computer Interaction. Interaction Platforms and Techniques. Springer Berlin Heidelberg, 2007. 643-652.*
TESCO Direct's Augmented Reality System, Nov. 27, 2011, printed from http://direct.tesco.com/p/inc/specials/ar/.
METAIO's "Otto mytrend Interactive Catalogue", as early as Apr. 23, 2011, printed from http://www.metaio.com/projects/web/otto-mytrend/, 2 pages.
An Augmented Reality Fashion Show developed by the FLARToolkit, disclosed at http://www.laboratory4.com/arfashion/, as early as Mar. 23, 2010, 6 pages.
Harnick, Chris, "IKEA Uses Augmented Reality to Launch PS Furniture Collection", Nov. 26, 2009, printed from http://www.mobilemarketer.com/cms/news/content/4729.html, 3 pages.
"iPhone Furniture Shopping App", Oct. 6, 2010, printed from http://www.hfbusiness.com/article/augmented-reality-furniture-shopping-app-lets-shoppers-try-before-buy/1, 2 pages.

* cited by examiner

*Primary Examiner* — Matthew Zimmerman
(74) *Attorney, Agent, or Firm* — Pillsbury Winthrop Shaw Pittman LLP

(57) ABSTRACT

A method, system, and apparatus is presented for presenting retail information on a device having an image capture unit and a user interface. The method, system, and apparatus may receive, from the image capture unit, an image of a retail item. A triggering feature in the image of the retail item may be detected. An augmented-reality-enhanced view may be presented on the user interface. The augmented-reality-enhanced view may overlay over the image of the retail item multimedia presenting a demonstration, such as a fashion show video, of a retail product associated with the image. A touch input on a touch screen of the user interface may be received, and an action based on the touch input may be performed. The action performed may include presenting information on the retail product or facilitating a transaction for the retail product.

18 Claims, 9 Drawing Sheets

METHOD, MEDIUM, AND SYSTEM FOR AN AUGMENTED REALITY RETAIL APPLICATION

FIELD OF THE INVENTION

The invention relates to systems and methods for applying augmented reality to retail applications.

BACKGROUND OF THE INVENTION

Augmented reality generally refers to a field in computer technology that relates to combining computer-generated information and real-world information, which typically involves overlaying virtual imagery over real-world imagery. For example, many television sports broadcasts now incorporate augmented reality applications to superimpose or otherwise overlay virtual images over real-world game action to provide viewers information about the broadcast or otherwise enhance the viewer experience (e.g., football broadcasts often superimpose a virtual "first down" marker to show the distance that the offense has to cover to continue a current drive, baseball broadcasts often superimpose a virtual "strike zone" marker to indicate whether a certain pitch was a ball or strike, etc.).

SUMMARY OF THE INVENTION

According to one aspect of the invention, a system, method, and computer-readable medium is disclosed for providing an augmented reality application for various retail applications. The invention relates to presenting retail information as part of an augmented-reality-enhanced view on a user interface device. The user interface device may include an image capture unit for capturing a background image. The augmented reality retail application may detect a triggering feature in the background image, and may in response present the augmented-reality-enhanced view on a user presentation device, such as a display screen, of the user interface device. The augmented reality retail application may be implemented through one or more components, including a feature recognition component that is configured to recognize a triggering feature from the background image, an augmented reality component that is configured to provide an augmented-reality-enhanced view based on the background image, a transaction component configured to facilitate a transaction with a retail product associated with the triggering feature or more generally with the background image, a consumer behavior tracking component configured to obtain information related to a user's consumer behavior, a search module configured to search for retail-related information based on a user's location, and any other component related to an application related to a retail experience.

The feature detection component or another component of the augmented reality retail application may be configured to detect from the background image a triggering feature that triggers presentation of an augmented-reality-enhanced view. According to one implementation, the triggering feature may be associated with a retail product or any other retail item, such as product packaging, a shopping bag, hang-tag, catalog, magazine, gift card, billboard, or any other retail-related item (e.g., a mannequin for clothing merchandise). The augmented reality retail application may present information associated with the retail item or facilitate a transaction, such as a purchase, associated with the retail item.

The augmented reality component or another component of the augmented reality retail application may be configured to present the information associated with the triggering feature or more generally with the background image. According to one implementation, the augmented reality retail application may include multimedia that is overlaid on the background image to form at least part of the augmented-reality-enhanced view. Multimedia may include, for example, text, animation, an image (e.g., a still image or a video displaying a plurality of still images), audio multimedia, tactile output, or any combination thereof. According to one implementation, the transaction facilitated by the augmented reality retail application may include a purchase or sale, lease, rental, reservation, or other acquisition or disposition related to a retail product associated with the triggering feature or more generally with the background image.

According to one implementation, the augmented reality retail application may be configured to detect the triggering feature on a shopping bag, retail packaging, hang-tag, catalog, or other retail item in a background image. The triggering feature may include a fiduciary marker, a marker that is invisible or otherwise imperceptible, or a recognizable feature in the background image. Such triggering features are discussed in more detail below. An object associated with the triggering feature may include, for example, a retail product, retailer logo, text on a hang-tag, or any other object in the background image from which the triggering feature was detected. In response to detecting the triggering feature, the augmented reality retail application may be configured to present an augmented-reality-enhanced view that overlays multimedia, such as a video, on the background image. The augmented reality retail application may determine from the triggering feature or more generally from the background image what multimedia to present.

In one example, the retail item is associated with clothing or clothing accessory merchandise, and the augmented reality retail application is configured to overlay a fashion show video on the background image as part of an augmented-reality-enhanced view. The fashion show video may display, for example, a model wearing or otherwise demonstrating merchandise associated with the triggering feature or more generally with the retail item. In one example, the augmented reality retail application may be configured to present the fashion show video with separate multimedia (e.g., audio output) that presents commentary related to the fashion, show. In one example, the augmented reality retail application may present a fashion show video and separate multimedia (e.g., an image) presenting merchandise being demonstrated by one or more models in the fashion show video. The augmented reality retail application may be configured to receive an user request that selects merchandise presented in the separate multimedia. In response to receiving the request, the transaction module or another module of the augmented reality retail application may be configured to facilitate a purchase or other transaction of the selected merchandise. The request may be received from, for example, a touch screen, a mouse, a keyboard, a microphone (e.g., one compatible for voice recognition) or any other user input device.

In one example, in response to detecting the triggering feature on the retail item, the augmented reality component or another component of the augmented reality retail application may be configured to overlay, on the background image, multimedia that includes a view of a retail product associated with the triggering feature or, more generally, with the background image. In one example, the view may present the retail product in a color, size, style, or other property selected by a user. In one example, the view may be a 3D view of the retail product. The 3D view may include, for example, a 3D rendering of the retail product or may include multiple views that present how the retail product appears from different perspectives. The augmented reality retail application may present, for example, a 3D object such as a cube, sphere, or any other multi-faceted 3D object, and may present on a portion of the 3D object's surface one of the multiple views of the retail product. In one example, the 3D rendering may show multiple retail products in a same collection. For the 3D cube, for example, each of a plurality of its sides may show a different retail product in the collection. In the example, one side of the cube may show a shirt in the collection while another side of the cube may show a pair of pants in the collection. The augmented reality retail application may be configured to receive a user request that triggers the augmented reality retail application to rotate the 3D object to rotate a hidden portion of its surface into view.

According to one embodiment of the invention, the consumer behavior tracking component or another component of the augmented reality retail application may be configured to obtain information related to consumer behavior. Consumer behavior of a user includes, for example, past purchases or transactions by the user, preferred purchase price, preferred brands, preferred stores, preferred shopping time, or any other shopping- or consumer-related habits and preferences of the user.

In one example, the augmented reality retail application may be configured to obtain the consumer behavior information by outputting a survey or other question format on the user interface device. In one example, the augmented reality retail application may be configured to obtain the consumer behavior by tracking retail information associated with retail items or, more generally, triggering features detected by the augmented reality retail application. Retail information may include, for instance, when the triggering feature was detected, what retail product was associated with the triggering feature or with the retail item, properties (e.g., brand, model, price, color, size) of the retail product, whether the retail product was purchased, what augmented-reality-enhanced view was presented to the user, what inputs were received from the user, the user's location, or any other retail information. In some implementations, the augmented reality retail application may be configured to obtain consumer behavior information by accessing various profiles of the user, such as a social networking profile or a user profile stored by a retailer. The augmented reality retail application may be configured to store the retail information and to determine one or more consumer preferences or habits based on the retail information.

In one example, the augmented reality retail application may be configured to present marketing information on the user interface device based on the consumer behavior, on the user's current or predicted location, or any combination thereof. Marketing information may include an advertisement, promotion, discount, or other offer. Marketing information may include information about a collection, a brand, a retail product, a store, or any other information. In one example, the consumer behavior upon which the marketing information is based may include a level of shopping activity by a user. The level of shopping activity may include, for example, an amount of time that a user spent at a particular store, a number of triggering features detected, a number of retail products purchased or amount of purchase, or any other shopping activity information. The marketing information may be presented as part of an augmented-reality-enhanced view, or may be presented in a different view.

According to one embodiment of the invention, the augmented reality retail application may be configured to perform a location-based search for a retail product. In one example, the augmented reality retail application may be configured to determine which stores in proximity to the user, such as stores within a threshold distance, have a retail product that satisfies a search request from the user. In one example, the user's location may be determined from a GPS receiver on a user interface device executing the augmented reality retail application or otherwise associated with the user. In one example, the search request may be received from a user input device associated with the user interface device. A result of the location-based search may be presented as part of an augmented-reality-enhanced view, or may be presented in a different view.

According to one aspect of the invention, a user may use the augmented reality retail application to obtain retail information, conduct a retail transaction, receive marketing information, or to conduct a location-based search request. In one example, the augmented reality retail application may be in communication with the image capture unit of the user interface device. The user may bring a scene or any other background in view of the image capture unit. The background may be in a home, a store, or any other location. The background may contain a retail item, such as a retail product, a catalog showing the retail product, a hang-tag or sticker attached to the retail product, a shopping bag or product packaging, a gift card, or any other retail item. The augmented reality retail application may be configured to detect a triggering feature in the background, such as on an image of a retail item in the background. The augmented reality module may then present an augmented-reality-enhanced view associated with the retail item or more generally with the background image.

In one example, the user may bring a retail item associated with clothing or clothing merchandise into view of the image capturing unit. In response, the user presentation device may present an augmented-reality-enhanced view that transforms part of the background image into a virtual runway stage and that displays a fashion show video and the runway stage overlaid on the background image. The fashion show video may display a model wearing or otherwise demonstrating clothing or clothing accessory. The augmented-reality-enhanced view may present multimedia of the worn clothing merchandise, such as by displaying images of the merchandise next to the fashion show video. The user may be able to select merchandise associated with one or more of the images in order to purchase the merchandise. The user may be able to select the merchandise by touching one or more of the images on a touch screen of the user presentation device, by clicking on one or more of the images with a mouse, or through any other form of input. In response to the selection, the augmented reality retail application may direct the user to a retailer's website for purchasing the selected merchandise, or may directly submit a purchase request or any other transaction request to a server configured to process the request.

In one example, in response to a user bringing a retail item into view of the image capturing, unit, the user presentation device may present an augmented-reality-enhanced view that displays a 3D view of a retail product associated with the retail item. The retail product may, for example be printed on a print medium, hidden from view (e.g., inside product packaging), or otherwise have one or more portions that cannot be seen from the background. In one example, the 3D view of the retail product may include a 3D rendering of the retail product on the user presentation device. The user may be able to interact with the 3D rendering, such as by rotating the 3D rendering or by otherwise moving the 3D rendering. Rotation of the 3D rendering may bring different perspectives of the retail object into view. In one example, the 3D view may include multiple views of the retail product, each from a different perspective than that of another view. Each view may be placed on a portion of a surface of a 3D object, such as a cube, sphere, or any other multi-faceted 3D object. For instance, one or more sides of the cube may each have one of the multiple views of the retail product, or may have a view of one of multiple retail products of a collection. The user may be able to interact with the 3D object, such as by rotating the 3D object or by otherwise moving the 3D object. Rotation of the 3D object may bring different perspectives of the 3D object into view. The user may be able to select the 3D view of a retail product to request information about the retail product or to conduct a transaction related to the retail product. The user may, for example, select the 3D view by touching it on a touch screen of the user presentation device, by clicking on the 3D view with a mouse, or through any other form of input. Selecting the 3D view of the retail product may cause, in one example, the user presentation device to present information, such as price or availability, about the retail product. In one example, selecting the 3D view of the retail product may cause a transaction related to the retail product to be initiated. The user may, for example, be presented with a retailer's website for purchasing the retail product or may be presented with one or more prompts in the augmented-reality-enhanced view that asks the user to confirm the purchase.

According to one aspect of the invention, the user's consumer behavior, including the user's interactions with the augmented reality retail application, may be tracked. In one example, the user may be presented with a survey related to the user's consumer preferences or habits such as preferred brands, pricing, shopping times and locations, or any other consumer-related information. In one example, as the user brings retail items in a background into view of the image capture unit, information related to the retail item viewed may be tracked. The information may include a time and duration for which the retail item was viewed, what associated retail product was viewed, and the user's location at the time the retail item was viewed. In one example, information of the user's interaction with an augmented-reality-enhanced view of the retail item may be tracked. The information may include what information (e.g., colors, sizes) was requested by the user, whether a retail product was purchased, or any other property relating to the user's consumer behavior or habits.

In one example, the user may be presented with marketing information based on the tracked consumer behavior or habits. The marketing information may indicate, for example, a retailer having a product with a brand and price that is preferred by the user and at a location that is preferred by the user. In one example, the marketing information may have promotion information, such as information related to a sale or coupon. In one example, the promotion information may be based on the user's activity with the augmented reality retail application. For example, a discount may be presented to the user after the user has viewed past a threshold number of retail items with the augmented reality retail application.

According to one aspect of the invention, the user may be able to perform a location-based search using the augmented reality retail application. In one example, the user may be able to submit a search for retail products that are in proximity to the user. The user may search for a type or brand of retail product (e.g., televisions), a type of retailer (e.g., electronic store), and may be able to specify preferred features, store locations, and store hours. The augmented reality retail application may determine one or more stores that have retail products satisfying the submitted search. In one example, the one or more stores may be ranked and outputted to the user.

Other objects and advantages of the invention will be apparent to those skilled in the art based on the following drawings and detailed description.

DETAILED DESCRIPTION

Figure 1:
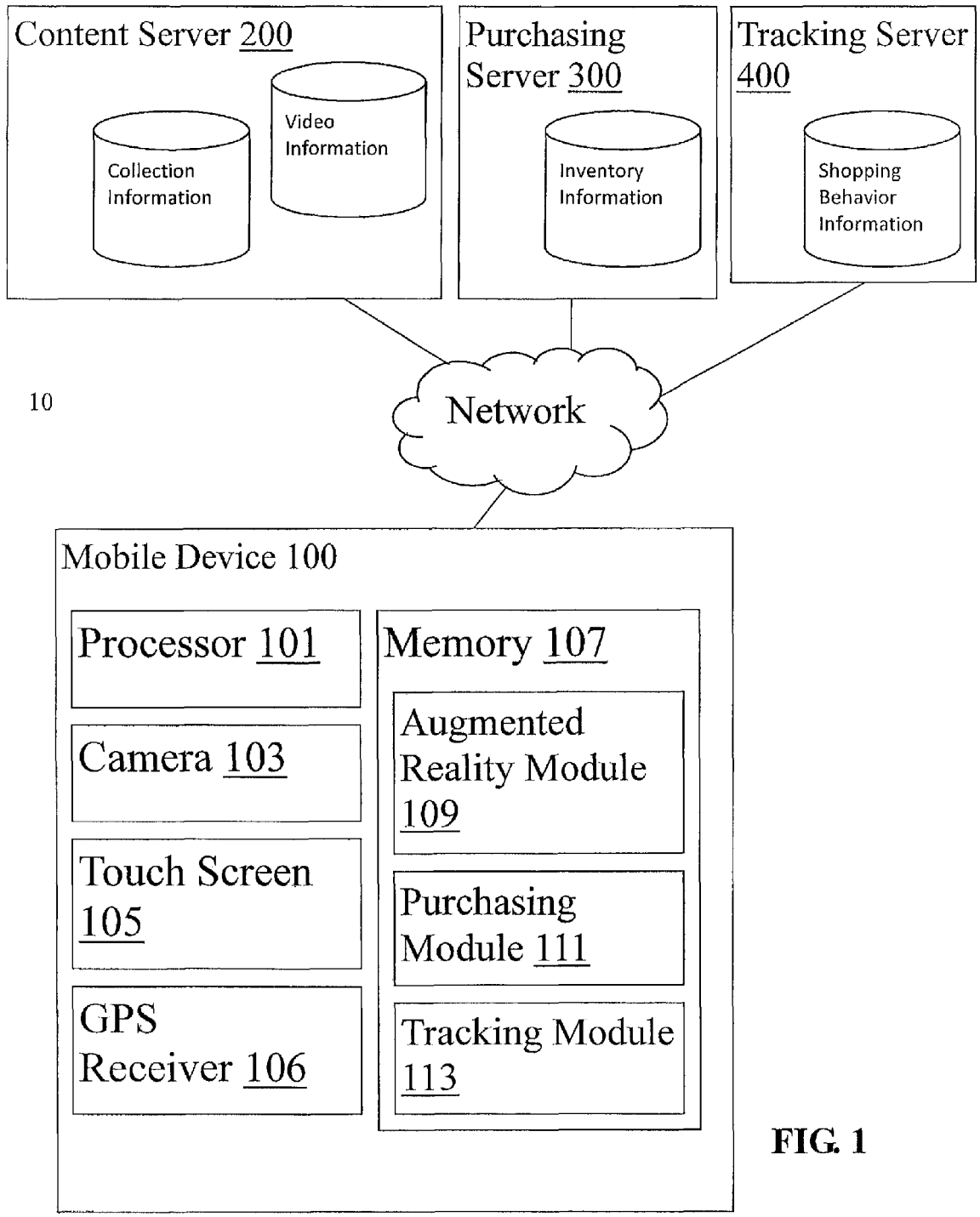
FIG. 1 illustrates an example retail environment capable of interacting with customers through presentation of an augmented reality.

According to one aspect of the invention, FIG. 1 illustrates an example system, method, and computer-readable medium for providing an augmented reality retail application for various retail applications. The augmented reality retail application may present on user presentation device 105 of user interface device 100 an augmented-reality-enhanced view that overlays multimedia over a background image captured by image capture unit 103. In one example, the background image may contain an image of a retail item, such as a retail product, product packaging, a shopping bag, hang-tag, catalog, magazine, billboard, or gift card. The multimedia overlaid on the background image may be related to the retail item. In some implementations, the augmented reality retail application may be configured to interact with a user through a user request received through user interface device 100. The interaction may include, for example, presenting information associated with a retail product selected by the user request, facilitating a transaction of a retail product selected by a user request, or searching for retailers or other suppliers that have a retail product satisfying a user's search request and that are within a proximity of the user. In some implementations, the augmented reality retail application may be configured to track information associated with a user's consumer behavior, such as through a survey or through tracking retail items viewed by the user.

The augmented reality retail application may be implemented through one or more modules that are executed on a single computing device or on multiple computing devices. The computing devices may include a mobile device, personal digital assistant, tablet computer, desktop computer, digital camera, digital photo frame, or gaming device. As illustrated in FIG. 1, the augmented reality retail application may be at least partially implemented on the user interface device 100 that presents the augmented-reality-enhanced view to the user. The augmented reality retail application may be implemented through one or more modules, including an augmented reality module 109, a feature detection module 110, a transaction module 111, a consumer behavior tracking module 113, a search module 117, and any other module. The one or more modules may comprise instructions stored in storage 107 (e.g., computer memory, Flash, or hard drive device) and may be executed by one or more processors, including processor 101. The one or more modules may comprise instructions that cause other programs, applications, modules, or instructions outside the augmented reality retail application to be executed.

Augmented reality module 109 may be configured to output the augmented-reality-enhanced view on user presentation device 105 (e.g., a display screen) or on any other user interface device. In some implementations, module 109 may be configured to receive an image of a background from image capture unit 103 and to overlay multimedia on the background image. Image capture unit 103 may include a camera configured to capture visible, infrared, or ultraviolet light. The received image may be a still image or part of a sequence of images, such as a sequence in a video stream. In one example, the background image may include an image of a retail item. The multimedia may include a text, image, or video displayed on a user interface, an audio output on the user interface, a tactile output on the user interface, or any combination thereof.

Module 109 may output the augmented-reality-enhanced view in response to detecting a triggering feature in the background image. In some implementations, module 109 may include a feature detection module 110 for detecting the triggering feature. The triggering feature may include a fiduciary marker, a marker that is invisible or otherwise imperceptible, or a recognizable feature in, the background image. A fiduciary marker may include a barcode or other pattern that is visible in the background image. Feature detection module 110 may be configured to execute, for example, an image recognition algorithm to detect the pattern. In one example, an invisible or otherwise imperceptible feature may include, for example, an infrared or ultraviolet marker. Module 110 may be configured to obtain from image capture unit 103 or from another module an indication of whether an infrared or ultraviolet marker has been detected. In one example, an invisible or otherwise imperceptible feature may include a visible marker that has been embedded into the background image through a signal processing or other technique that makes the marker substantially imperceptible. In one example, module 110 may be configured to execute a signal processing algorithm to determine whether the background image embeds an imperceptible marker. In one example, a recognizable feature in the background image may include a feature associated with a retail item in the image. The feature may include a shape (e.g., shape of a shopping bag, hang-tag, logo, mannequin, or shape of a retail product), color (e.g., colors associated with a retailer), text (e.g., a retailer's name), or any other feature (e.g., facial features of models in a catalog). Module 110 may be configured to execute an image recognition algorithm to detect the recognizable feature. Executing an algorithm may include calling a program, application, library, module, or instruction that is outside the augmented reality retail application.

In response to detection of the triggering feature in the background image, module 109 may overlay multimedia on the background image. In some implementations, augmented reality module 109 may communicate with content server 200 to retrieve multimedia information (e.g., text, images, animations, videos, audio files). Multimedia that module 109 may be configured to overlay includes a fashion show video, a 3D view of a retail product, an animation of a gift box, and text related to the retail item in the background image. The multimedia may be overlaid on an image that may include a retail product, shopping bag, product packaging, hang-tag, catalog (which may itself show an image of a retail item), gift card, or any other retail item.

In some implementations, module 109 may be configured determine a multimedia to present based on the retail item in the background image. For example, module 109 may present the animation of a gift box only if the retail item is a gift card. Module 109 may present a fashion show video only if the retail item relates to clothing merchandise. Module 109 may present a 3D view of a retail product only if the retail item comprises a print medium such as a catalog or magazine.

In some implementations, module 109 may be configured to receive a user request, such as through user interface device 100, and may update the augmented-reality-enhanced view based on the user request. The user request may include, for example, a touch gesture, another touch input, a mouse click, a keyboard input, or any other input. For example, if user presentation device 105 were a touch screen, the user request may include touching an image of a retail item in the augmented-reality-enhanced view. If the augmented-reality-enhanced view included a 3D view, for example, the touch input may include a swipe gesture for requesting rotation of the 3D view.

In some implementations, transaction module 111 may be configured to facilitate a transaction related to a retail product. For example, module 111 may be configured to receive from user interface device 100 a user selection of a retail product. The selection may be associated with a retail product presented in the augmented-reality-enhanced view. In some implementations, user presentation device 105 may include a touch screen, and user selection may be received from the touch screen.

In some implementations, in response to the selection, module 111 may present the user with a website from which the user may purchase, sell, rent, lease, borrow, lend, or conduct some other transaction related to the retail product. Module 111 may populate any forms on the website with user information stored in a user profile.

In some implementations, in response to the selection, transaction module 111 may communicate with transaction and inventory server 300 to initiate a request to, for example, purchase the selected retail product. Module 111 may retrieve payment information from user interface device 100 or from a database stored on a server. Transaction and inventory server 300 may then transmit the payment information or other purchase-related information to a retailer, manufacturer, or other supplier of the purchased retail product. If the server is operated by the supplier, the purchase-related information may be transmitted to a delivery department of the supplier. In some implementations, transaction and inventory server 300 may store inventory information that identifies which supplier carries a particular product. The inventory information may allow the server to identify a supplier having a retail product of a particular category, brand, color, size range, price range, or condition.

In some implementations, tracking module 113 may be configured to obtain consumer behavior information of a user. For example, module 113 may track shopping activity of a user and communicate such information to tracking server 400. Tracking server 400 may store shopping behavior information of one or more users. In some implementations, module 113 may be configured to output one or more surveys to a user and to receive user responses to the one or more surveys. The one or more surveys may be related to a user's consumer preferences or habits. In some implementations, module 113 may communicate with augmented reality module 109 to track a time at which the user has viewed a retail item with user interface device 100, what retail item was viewed, how the user interacted with the augmented-reality-enhanced interface, what retail information was requested by the user, whether the user purchased a retail product, or any other information related to consumer preferences or habits. Module 113, a module on tracking server 400, or a combination thereof may be configured to analyze the consumer behavior information and to output marketing information to the user based on the analyzed consumer behavior information. The marketing information may include an advertisement, promotion, discount, or other offer. In some implementations, module 113 may communicate with module 109, which may present the marketing information as part of an augmented-reality-enhanced view. In some implementations, module 113 may be configured to communicate with one or more servers that store one or more user profiles that may have information related to consumer behavior. The one or more servers may include a social networking server (e.g., Facebook™ server, retailer server, etc.).

In some implementations, search module 117 may be configured to perform a location-based search associated with a retail product. In some implementations, module 117 may receive a search request as part of a user request from user interface device 100. The search request may specify a retail product or retail product properties sought by a user. In response to the search request, search module 117 may be configured to determine one or more stores, dealerships, or other supplies of retail products that have a retail product satisfying the user's search request and that are within proximity of the user. In some implementations, search module 117 may communicate with a server, such as transaction and inventory server 300, to determine which suppliers satisfy the search request and to determine the suppliers' locations. In some implementations, search module may be configured to communicate with location tracking device 106 (e.g., a GPS receiver, RFID receiver) to determine the user's location. In some implementations, search module 117 may be configured to communicate with augmented reality module 109 to present a result of the search as part of an augmented-reality-enhanced view.

Figure 2:
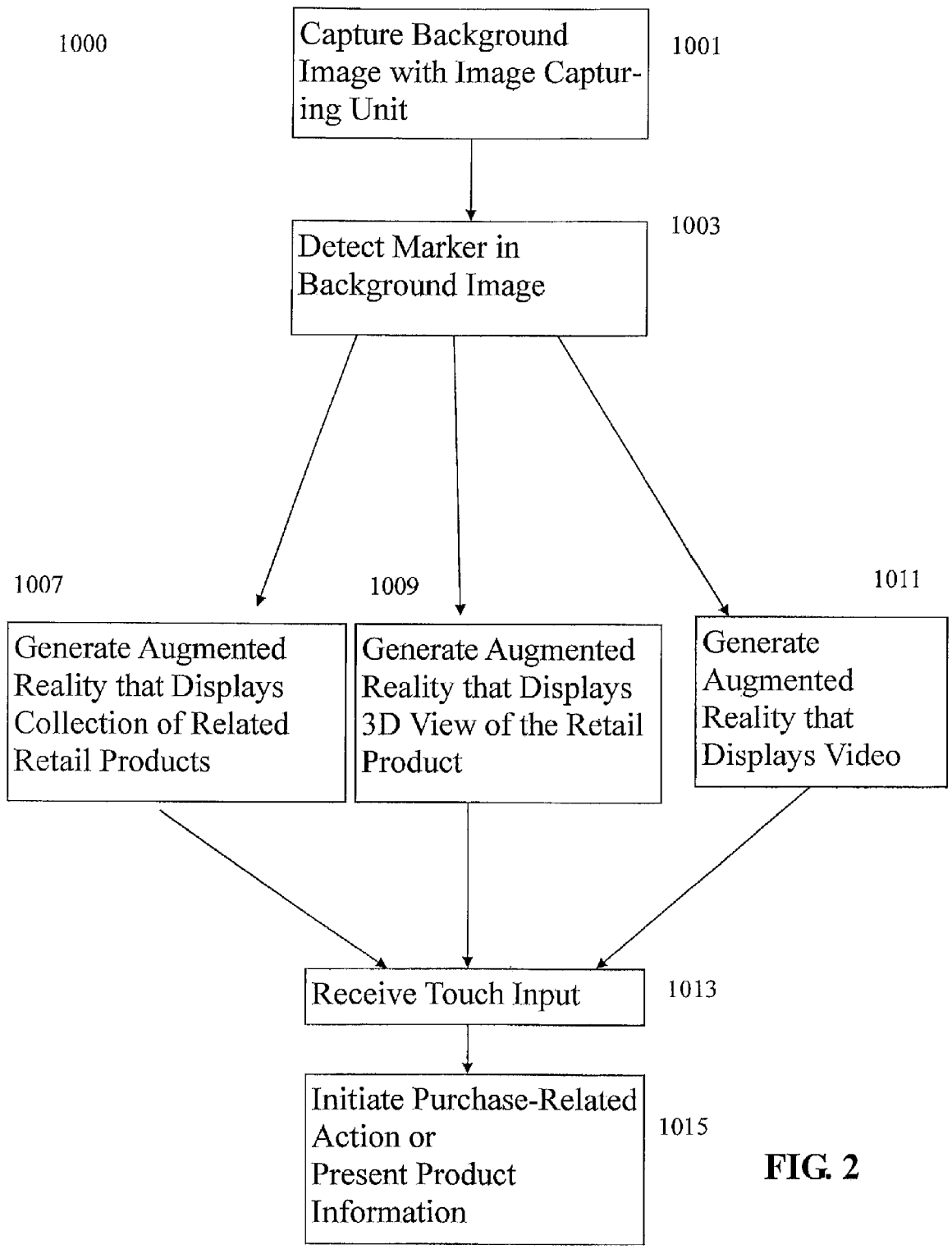
FIG. 2 illustrates an example method for presenting an augmented reality for a retail environment.

According to one aspect of the invention, FIG. 2 illustrates an example method 1000 for presenting an augmented-reality-enhanced view that presents retail information. Method 1000 may be performed by the augmented reality retail application or by any other application. In some implementations, one or more operations of method 1000 may be executed by one or more processors, such as processor 101 of user interface device 100. One or more operations may be performed sequentially or simultaneously, and multiple operations may be performed synchronously or asynchronously. In some implementations, method 1000 (and methods 1100, 1200, and 1300 discussed below) may be accomplished with one or more additional operations not described, and/or without one or more of the operations discussed. Additionally, the order in which the operations of method 1000 (and methods 1100, 1200, and 1300) are illustrated in FIG. 2 and described below is not intended to be limiting.

At operation 1001, a background image may be captured with an image capture unit, such as with image capture unit 103. The image capture unit may be part of a mobile device used in a store or a desktop computer used in a home. For example, an image of a retail item may be captured at a store, mall, or other retail location, at a user's home, or at any other location where a retail item is present (e.g., at a bus stop where a billboard is present). The retail item may include a retail product such as clothing merchandise or consumer electronic merchandise, may include a shopping tag (e.g., hang tag, sticker, etc.) attached to the retail product, a shopping bag, product packaging, retailer's flyer or poster, retailer catalog, magazine, gift card, or any other item related to the retail product or a retailer selling the retail product. The captured image of the retail item may be used as a background image of an augmented reality to be displayed on a user presentation device, such as user presentation device 105. In some implementations, device 105 may be a touch screen.

At operation 1003, a triggering feature may be detected in the captured image. The trigger may be a fiduciary marker, an invisible or otherwise imperceptible marker, or a recognizable feature in the captured image. In one example, a retailer's logo may be used as a marker and may be printed on hang-tags, shopping bags, or product packaging. When a background image having one of the hang-tags, shopping bags, or product packaging is captured, the logo may be detected. In one example, a retail item's shape or color may be detected as a triggering feature. An image recognition algorithm may be executed to recognize the retailer's logo, a barcode, a retail product, a mannequin or model demonstrating a clothing retail product, or any other feature used as a triggering feature.

After the marker is detected, various augmented-reality-enhanced views may be presented to a user at operations 1007, 1009, and 1011. An implementation of method 1000 may perform only one, several, or all of the operations. If a plurality of the operations are performed, they may be performed sequentially, simultaneously, or any combination thereof. In some implementations, selection among the operations may be based on a type of retail item in the background image. For example, operation 1007 may be performed in response to detecting product packaging in the background image, operation 1009 may be performed in response to detecting a catalog or a retail product in the background image, and operation 1011 may be performed in response to detecting a shopping bag in the background image.

Figure 3:
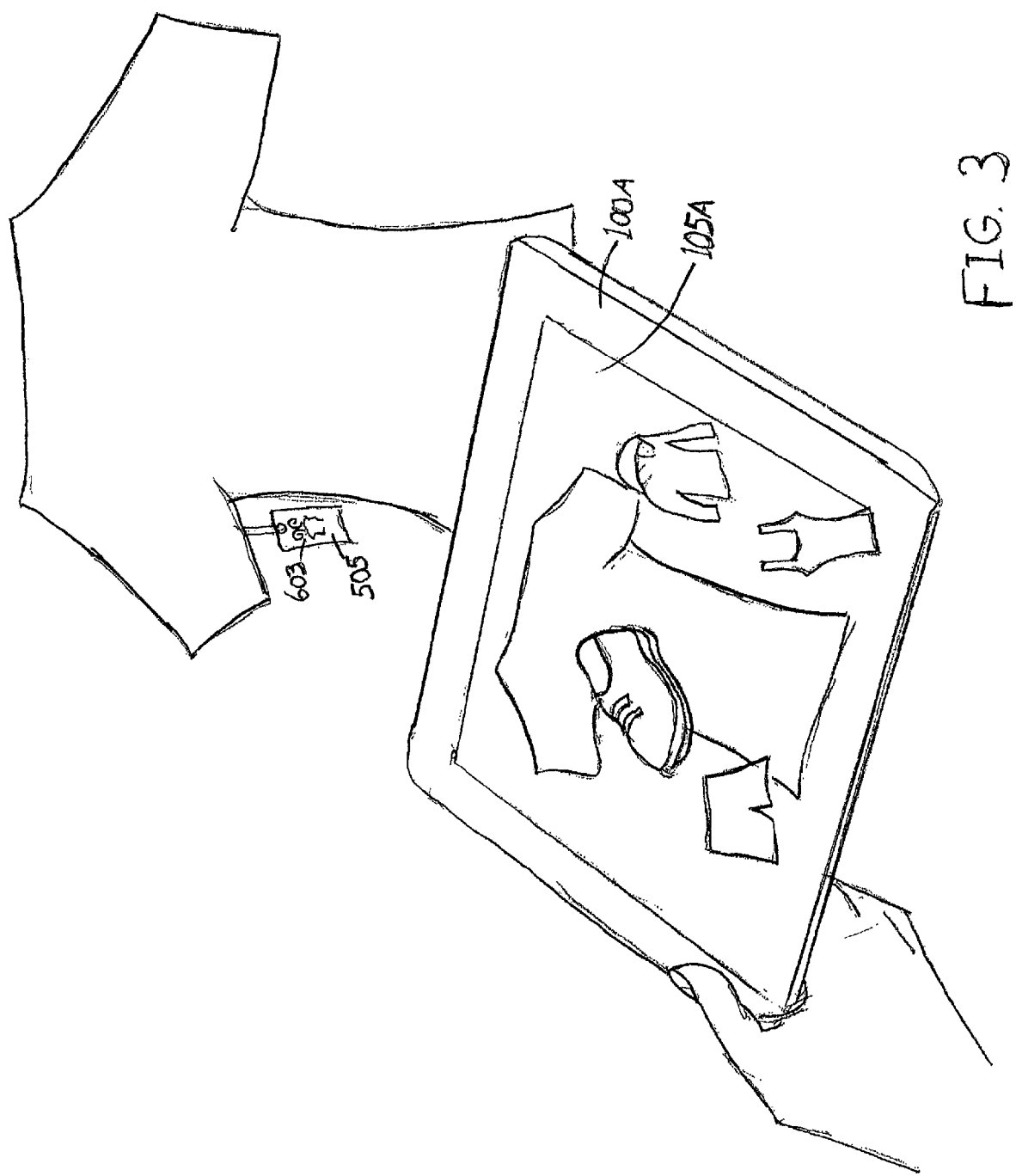
FIGS. 3-5 illustrate example views of augmented realities that facilitate interaction with a retail environment.

At operation 1007, an augmented-reality-enhanced view may be generated that displays multimedia of a collection of retail products. The collection may be related to a retail product in the background image or to a retail product associated with the detected triggering feature in the background image. For example, an image recognition algorithm may be executed to recognize a retail product from the background image. A collection of products having a same brand, style, or some other property in common with the recognized retail product may be presented in an augmented-reality-enhanced view. The augmented-reality-enhanced view may overlay the multimedia on the background image. FIG. 3 illustrates an example augmented-reality-enhanced view that displays a collection on a user presentation device 105A of a tablet computer 100A. In the example in FIG. 3, a background image having a T-shirt and its hang-tag 505 may be captured at operation 1001. A triggering feature, such as logo 603 on tag 505 or features of the T-shirt may be detected at operation 1003. At operation 1007, clothing merchandise in a same collection as the T-shirt may be retrieved, such as by augmented reality module 109 from content server 200. Multimedia, such as images or animation, of the merchandise may be overlaid on the background image. For example, FIG. 3 illustrates images of shoes, shorts, a sweatshirt, and tank top in a same collection as the T-shirt. The images are overlaid on the background image of the T-shirt. In some implementations, the background image may be modified. For example, an animation of the T-shirt, rather than the captured image of the T-shirt, may be shown as the background image.

Although the examples in FIGS. 2-5 illustrate augmented-reality-enhanced views that present multimedia of clothing merchandise, other retail products, such as consumer electronics, toys or games, or vehicles may be represented.

Figure 4:
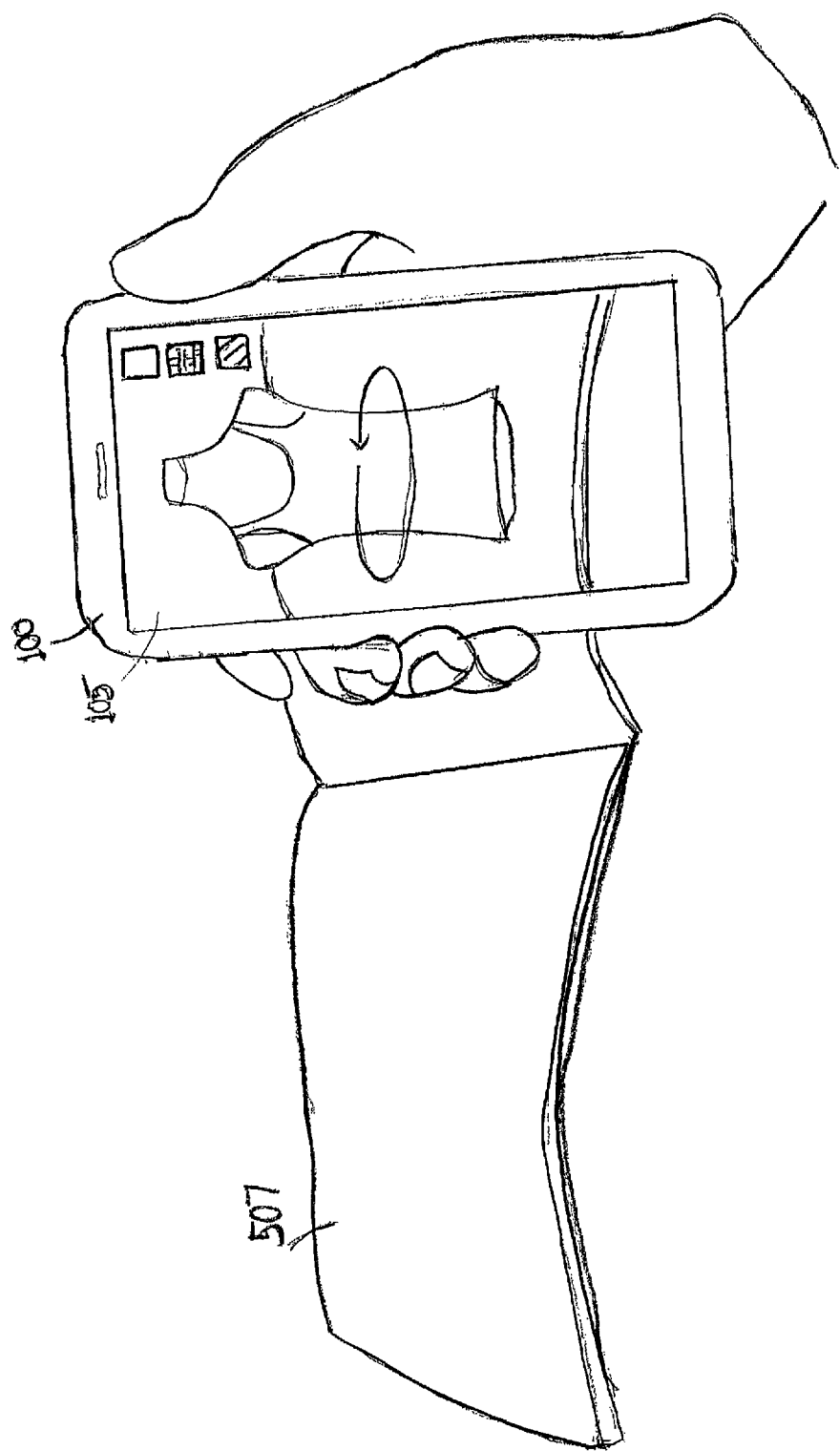

At operation 1009, an augmented-reality-enhanced view may be generated that displays a 3D view of a retail product in the background image, associated with a triggering feature in the background image, or with any other feature in the background image. For example, the retail product may be clothing merchandise from a captured image of a catalog or retail product associated with text or barcode on a hang-tag in a captured image. An image recognition algorithm may recognize, for example, the clothing merchandise in the catalog, or may recognize the text or barcode. In some implementations, a 3D view may include a 3D rendering of the retail product. FIG. 4 illustrates an example of an augmented-reality-enhanced view that displays a 3D rendering of clothing merchandise recognized from a catalog 507. The 3D rendering may be displayed on user presentation device 105 of user interface device 100. A user may be able to interact with the 3D rendering, such as by being able to rotate the 3D rendering on the screen. The 3D rendering may be able to display a color, size, or cut that is different than what is shown on catalog 507.

In some implementations, a 3D view may display multiple views that each display a perspective of the retail product. For example, the 3D view may display a 3D object such as a cube or sphere. Each of one or more views may be placed on a portion of a surface of the 3D object. In one example, each side of the cube may show an image of the retail product from a different perspective. In one example, the augmented-reality-enhanced view may display a cube that shows a front side view of the retail product on a front side of the cube, a back side view of the retail product on a back side of the cube, a left side view of the retail product on a left side of the cube, and a right side view of the retail product on a right side of the cube. The cube may thus be rotated, automatically or through a user request, to show different perspectives of the retail product. Images or 3D renderings may be generated by, for example, augmented reality module 109 or retrieved from content server 200. In some implementations, the augmented-reality-enhanced view may replace an object in the background image with the 3D rendering. For example, operation 1109 may generate an augmented-reality-enhanced view in which the image of a retail product in the catalog transforms into and is replaced by the 3D rendering of the retail product.

At operation 1011, an augmented-reality-enhanced view may be generated that displays a video, such as a fashion show video. For example, augmented reality module 109 may retrieve a fashion show video from content server 200 for display. In some implementations, the fashion show video may be associated with a retailer. For example, if the background image contains a shopping bag, a triggering feature on the shopping bag may be associated with a retailer. The fashion show video may display a model wearing clothing merchandise sold by, designed by, or otherwise associated with the retailer. In some implementations, the fashion show video may be associated with a retailer identified by the marker and may be based on a retail product, if any, detected in the background image. For example, a fashion show video of dresses from the retailer may be displayed if a purchased dress is recognized in the background image. In some implementations, the fashion show video may be based on a location of a device, such as user interface device 100, presenting the augmented reality. For example, a fashion show video of men's clothing may be displayed on a mobile device located in a menswear department of a store, while a fashion show video of jewelry may be displayed on a mobile device in a jewelry department of a store. A fashion show video showing winter clothing, for example, may be displayed on a mobile device in a store located in Massachusetts, while a fashion show video showing summer clothing may be displayed on a mobile device in a store located in Florida.

In some implementations, the augmented-reality-enhanced view generated at operation 1011 may include commentary (e.g., textual, visual, or audio) of clothing that are being demonstrated by a fashion show model in the fashion show video. The commentary may present information about a designer, material, or other information related to the clothing.

Figure 5:
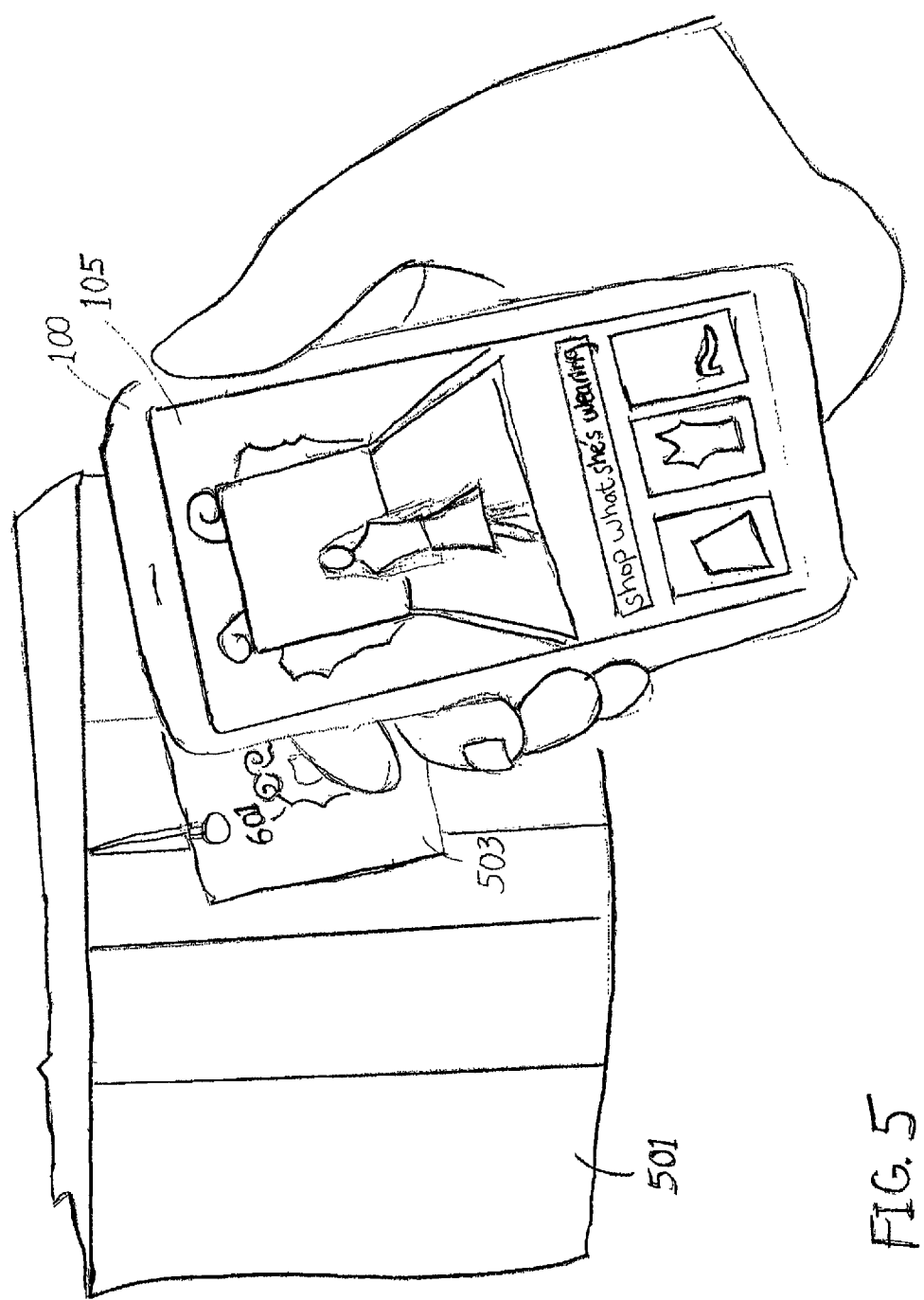

FIG. 5 illustrates an example augmented-reality-enhanced view that displays a fashion show video on user presentation device 105 of user interface device 100. The augmented reality may be displayed on the screen in response to detecting a triggering feature, which may comprise logo 601 on hang-tag 503 or may comprise, for example, a pattern on bag 501, or a shape of bag 501. The triggering feature may identify a retailer associated with the logo or shopping bag, may identify a retail product, or any combination thereof.

The augmented-reality-enhanced view in FIG. 5 may render a fashion runway stage that appears to extend from the background image of shopping bag 501. The fashion show video may be overlaid on the background image and on the fashion runway stage. The fashion show video may show models wearing clothing or clothing accessories (e.g., jewelry, hats, scarves) sold by the retailer, as discussed above. The augmented reality may further display multimedia, such as an image or animation, of the clothing or clothing accessories being worn. The multimedia may be displayed below a message indicating that the modeled clothing is available for purchase. For example, an image of a skirt, an image of a blouse, and an image of one of a pair of shoes worn by a model in the fashion show video may be displayed. The images may be displayed in the augmented-reality-enhanced view as a panel on a side of or below the fashion show video. As discussed more below, a user may be able to purchase the skirt, blouse, or pair of shoes by touching its corresponding image in the panel.

Although the discussion above relates to clothing merchandise, in some implementations augmented-reality-enhanced views relating to other types of retail products may be displayed. For example, while a fashion show video may be displayed to demonstrate clothing or clothing accessories, other types of products may be displayed in other product demonstration videos. In one example, the augmented-reality-enhanced view may display a test drive video for a triggering feature associated with a car or a video slide show of consumer electronic devices for a triggering feature associated with a manufacturer of consumer electronic devices.

In some implementations, an augmented-reality-enhanced view may display a character, such as an animated model, wearing clothing merchandise, and may be triggered by a feature such as a floor marker. For example, when a user captures a background image with the floor marker, an augmented-reality-enhanced view may present a model (e.g., cartoon character) wearing clothing merchandise. The clothing merchandise to be worn may be selected by the user. For example, the augmented-reality-enhanced view may present a plurality of clothing merchandise in a same collection. A user may be able to select one of the plurality of clothing merchandise, such as through a touch screen. In response to the selection, a rendering of the model wearing the selected clothing merchandise may be generated and presented. If the floor marker were placed in front of a mirror, the marker may be detected in the mirror, and the augmented-reality-enhanced view may present the model next to a reflection of the user.

In some implementations, the background image of an augmented-reality-enhanced view may be static. For example, after a background image of a background is captured by a camera, the augmented-reality-enhanced view may use that background image even after the camera has moved or the background has otherwise visually changed. In some implementations, the background image enhanced view may be dynamically updated. For example, the background image used in the augmented reality may be an image currently captured by the image capturing unit, and may thus be updated as the unit moves or as the background otherwise changes.

In some implementations, the augmented-reality-enhanced views described above may interact with users. At operation 1013, for example, a user request may be received to interact with an augmented-reality-enhanced view. The user request may include, for example, a touch input, mouse click, keyboard input, a voice input, or any other input. A touch input may be received on a touch screen or touchpad to interact with an augmented-reality-enhanced view displayed on the touch screen. If the touch input comprises a touch on the touch screen, it may be received over where an image of a retail product is displayed or where an image of a button or other icon is displayed.

Based on the received request, an action related to the retail product may be performed at operation 1015. The action includes presenting information about the retail product or initiating a transaction or other action related to the retail product.

Information about the retail product may include its appearance (e.g., shape, color), availability, price, quality, or any combination thereof. For example, if a touch input is received over the image of the shoe displayed on user presentation device 105A in FIG. 3, text information showing features and pricing of the shoes may be displayed as part of the augmented-reality-enhanced view illustrated in FIG. 3. If a touch input such as a swiping gesture is received on user presentation device 105 illustrated in FIG. 4, the 3D rendering of the clothing may be rotated on the screen in the direction of the swiping gesture. Rotation of the 3D rendering may present information on how the clothing appears from different perspectives. If a touch input is received over one of the three images of a button at the upper right corner of screen 105 in FIG. 4, the 3D rendering may be updated to reflect a color and/or texture associated with the touched button. In some implementations, the information may be presented as part of the generated augmented-reality-enhanced view. In some implementations, the information may be presented in a different format. For example, after an image of the shoe in FIG. 3 is touched, a webpage related to the shoe may be presented.

A transaction for the retail product may include a purchase, sale, lease, rental, or reservation of the retail product. Facilitating a purchase transaction for a retail product may include placing the product in a shopping cart, retrieving payment information, verifying payment information, submitting purchase information, or any combination thereof. For example, a purchase-related action may be performed by transaction module 111, which may communicate a purchase request to transaction and inventory server 300, communicate any payment, identity verification, or delivery information to transaction and inventory server 300, and may receive a purchase confirmation from transaction and inventory server 300, which may be operated by a retailer, intermediary between a retailer and customer, or any other party.

In some implementations, the shopping cart may be presented as a wardrobe or other representation of a retail product archive. The wardrobe view may be generated by augmented reality module 109, for example, but may be either an augmented-reality-enhanced view or a view that is not an augmented-reality-enhanced view. The user may be able to move, for example, clothing merchandise shown on the augmented-reality-enhanced view to a hanger in the wardrobe view for future viewing or purchasing.

Another action related to the retail product may include communicating with a social networking or e-mail server with which the user has interacted. The communication may include a message related to the retail product from the user. By tapping on an image of a retail product in an augmented-reality-enhanced view, for example, the user may thus be able to post through transaction module 111 a message to his or her social networking account asking, for example, whether he or she should purchase the retail product. The action may further include receiving responses to the posting from the social networking server. For example, transaction module 111 may receive the responses and communicate with augmented reality module 109 to present the responses in the augmented-reality-enhanced view. In one example, module 111 may be configured to tabulate or perform other processing on the responses. For example, module 111 may be configured to indicate to augmented reality module 109 that 75% of the user's friends responded positively to the user's posting of whether he or she should buy a clothing merchandise. In some implementations, the user may view the responses through an e-mail or social networking platform.

In some implementations, an action related to a retail item such as a gift card may be performed. For example, a user input to add a friend or other user as a recipient of the gift card may be received. The additional recipient may be transmitted to a database associated with gift card recipient information.

A user request at operation 1013 may be received through image capture unit. For example, if a marker or a retail item in the background is rotated, the rotation may be detected by comparing background images captured from image capture unit at different instances in time. In response to detecting the rotation, multimedia displayed in the augmented-reality-enhanced view may also be rotated.

Figure 6:
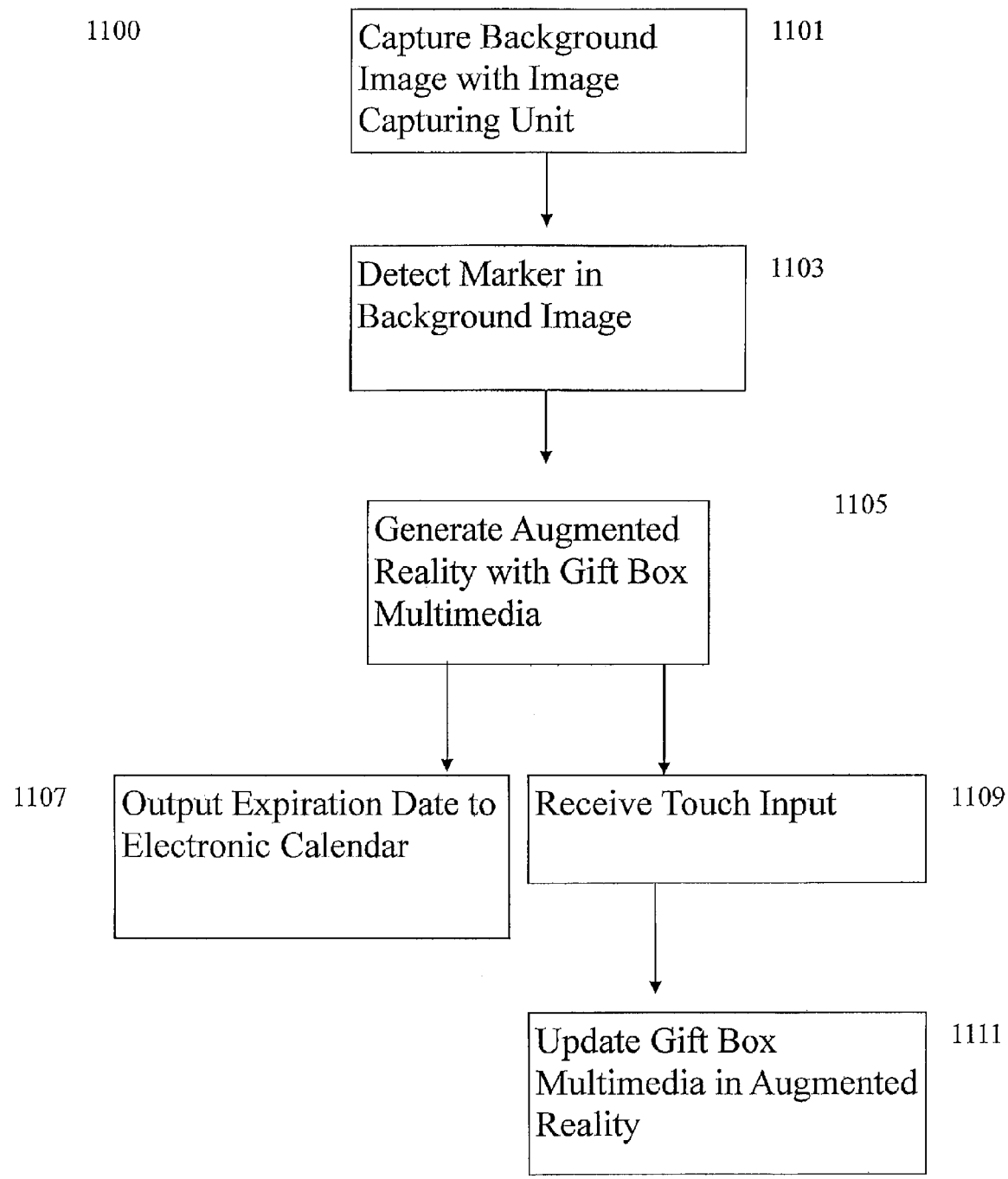
FIG. 6 illustrates an example method for presenting an augmented reality for a retail environment.
Figure 7:
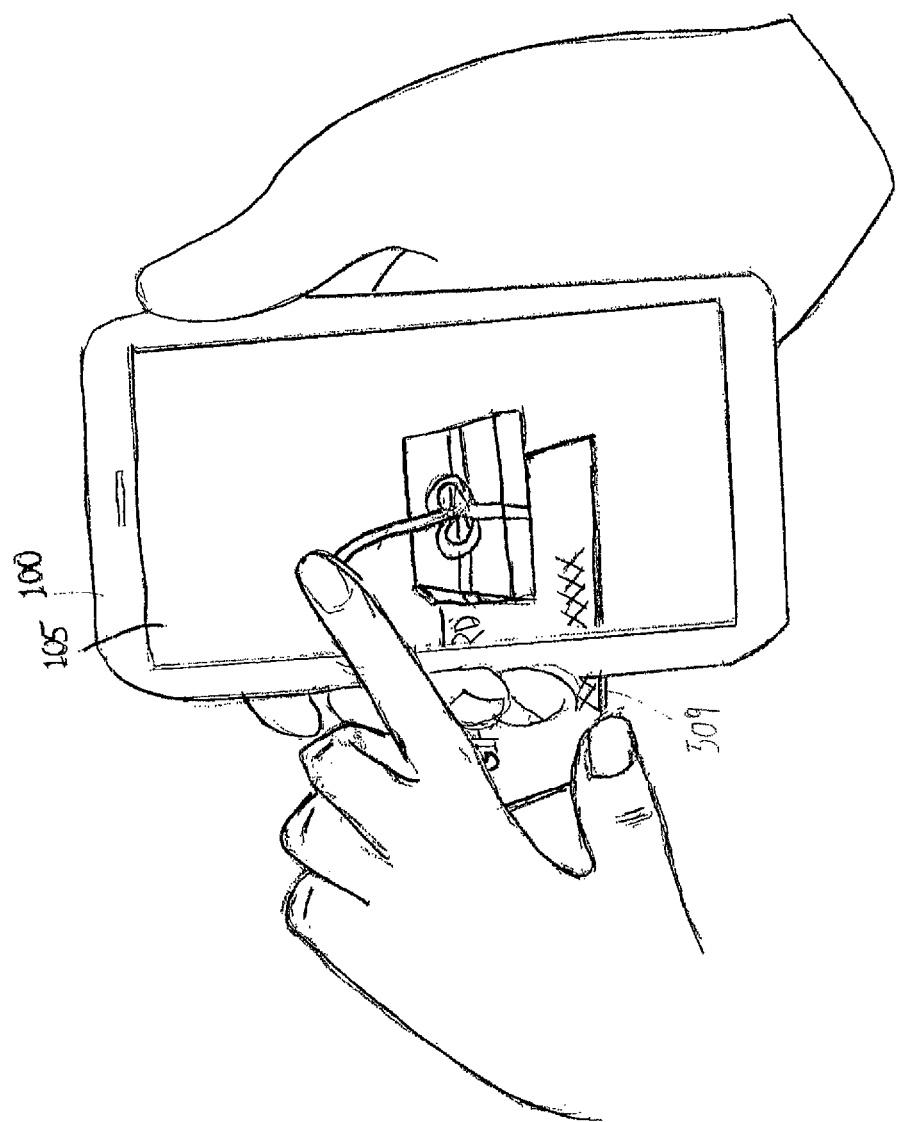
FIG. 7 illustrates an example view of an augmented reality that facilitates interaction with a retail environment.

According to one aspect of the invention, FIG. 6 illustrates a method 1100 for presenting an augmented-reality-enhanced view related to a gift card, debit card, credit card, loyalty card, gift certificate, coupon, or other redeemable instrument. At operation 1001, a background image may be captured with an image capture unit. The background image may include an image of the card, certificate, coupon, or other redeemable instrument. FIG. 7 shows an example in which a background image containing a gift card 509 is captured by image capture unit 103 of user interface device 100. A triggering feature may be detected from the background image at operation 1003. At operation 1003, a triggering feature may be detected in the background image. The feature may be an augmented reality marker such as a barcode or logo, or may be a natural feature tracking marker, such as a name of a retailer or a card number printed on the gift card. A card recipient may also be detected, and may be recognized by, for example, augmented reality module 109, feature detection module 110, any other module, or a combination thereof.

At operation 1105, an augmented-reality-enhanced view that displays gift box multimedia may be generated. The gift box multimedia may be an image, video, or animation of a gift box, and may be overlaid on the background image. FIG. 7 illustrates an example gift box illustration overlaid on a background image of gift card 509. In some implementations, the augmented-reality-enhanced view may replace the marker in the background image with the gift box multimedia. For example, operation 1105 may generate an augmented-reality-enhanced view in which the image of a fiduciary marker in the background image transforms into an animation of the gift box.

A user may be able to interact with the augmented-reality-enhanced view through a user request at operation 1013, as discussed above. The request may be received at, for example, user presentation device 105 of user interface device 100, as illustrated in FIG. 7. In the illustration, device 105 comprises a touch screen configured to receive a touch input. In response to the touch input, the augmented-reality-enhanced view may be updated at operation 1111. For example, at operation 1109, a touch input such as a swiping gesture may be received over an image of a bow of the gift box animation shown in FIG. 7. At operation 1111, the animation of the gift box multimedia may be updated to show the bow being drawn in the direction of the swiping gesture. The gift box multimedia may further be updated to show an animation in which the gift box is unwrapped and reveals a card value, message from a donor, or video of a retail product associated with gift card 509. The video may showcase products available from an issuer of the gift card.

At operation 1107, an expiration date associated with the card may be outputted to an electronic calendar to remind a user to use the card before it expires. For example, at operation 1107, user interface device 100 or any other device may communicate with a calendar server such as an Outlook® server to post the expiration date on the calendar. User interface device 100 may also or alternatively output the expiration date to a calendar stored on the mobile device.

Figure 8:
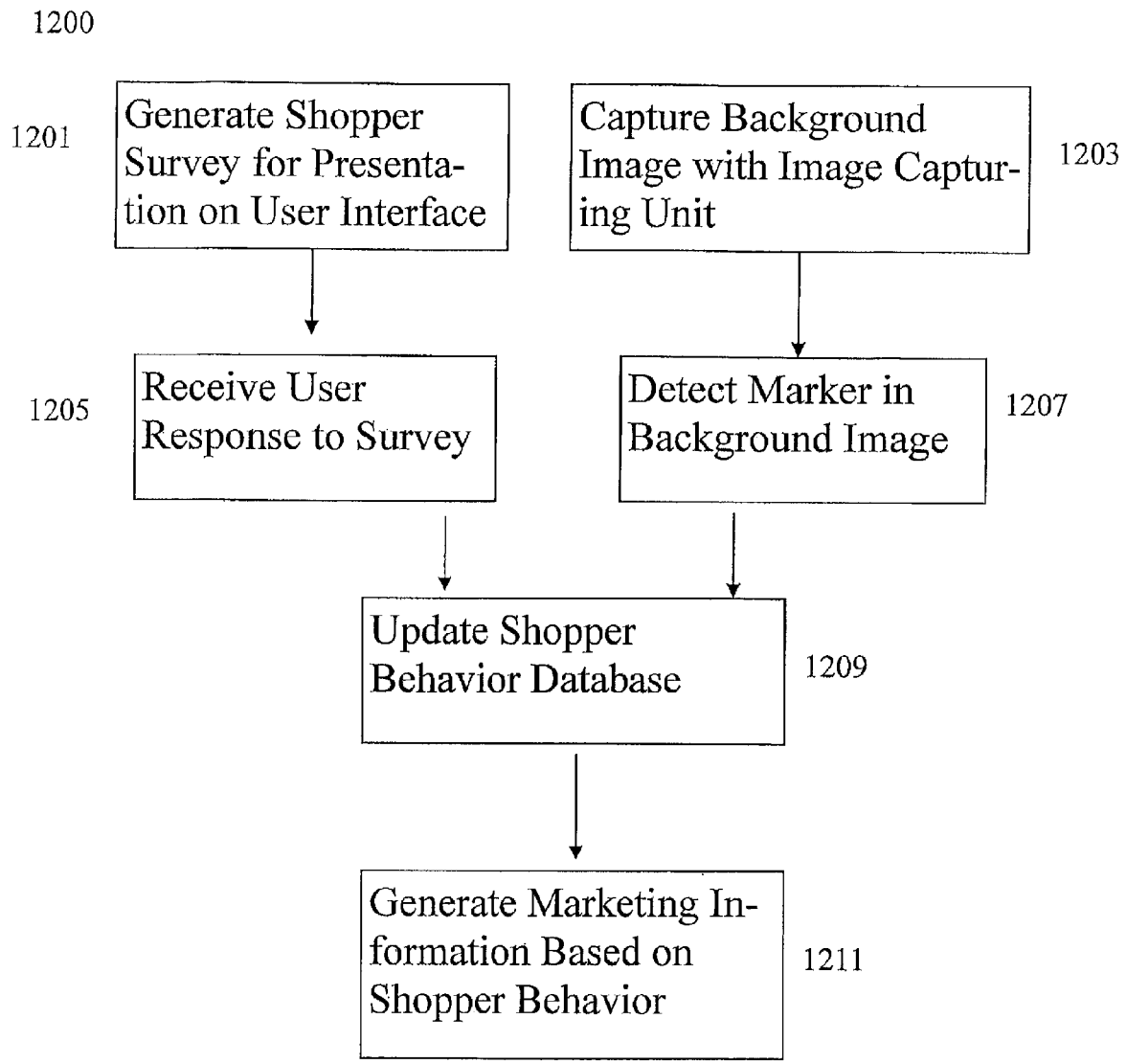
FIG. 8 illustrates an example method for tracking shopper behavior.

According to an aspect of the invention, FIG. 8 illustrates a method 1200 for tracking consumer behavior information and presenting marketing information based on consumer behavior. Consumer behavior of a user may include, for example, retailers at which a user prefers to visit, retail products that the user prefers to browse and/or purchase, a price range for which the user prefers for a retail product, and times or locations at which the user prefers to shop.

In some implementations, consumer behavior information may be obtained through a consumer survey, which is generated at operation 1201. For example, a survey asking a user's preferred brands, prices, and past shopping choices may be generated. The survey may be generated by, for example, tracking module 113. Questions for the survey may be stored on user interface device 100 or retrieved from tracking server 400. After a user's response to the survey is received at operation 1205, a database that stores consumer behavior of one or more users may be updated at operation 1209. The database may be stored on, for example, tracking server 400, and may be updated by, for example, tracking module 113.

In some implementations, consumer behavior may be based on retail items viewed by a user, such as retail items viewed through user interface device 100. At operations 1203 and 1207, a background image having a retail item may be captured, such as by image capture unit 103, and a triggering may be detected in the background image. After the feature is detected, a retailer, retail product, or other retail item (e.g., gift card) associated with the triggering feature or with any other feature in the background image may be associated with the user in the consumer behavior database at operation 1209. Other retail-related information, such as a time at which the retail item was viewed, a location at which the retail item was viewed, touch input and other interactions with an augmented-reality-enhanced view for the retail item, and whether a retail product was purchased may be stored on the shopping behavior database.

In some implementations, consumer behavior information may be obtained from one or more user profiles stored on an external server. The external server may be a social networking server or a retailer server. Information from the survey, viewing activity of the user, and user profile may be analyzed to determine consumer behavior and to generate marketing information based on the consumer behavior.

At operation 1211, marketing information based on the shopping behavior database may be generated and presented to a user. In some implementations, the marketing information may present to a user retail products having a brand or price that matches a consumer preference or habit of the user. For example, if the database indicates that the user has recently bought a coat, the marketing information may display a matching scarf that is available for purchase. In some implementations, the marketing information may present a retailer having a location and carrying a style of products that match a preference of the user. In some implementations, the marketing information may present a discount or other promotion that just became available and that relates to a retail product the user viewed earlier (e.g., 24 hours earlier) on a user interface device. The promotion may be targeted toward the same retail product that was viewed, toward a retail product in a same collection as the product that was viewed, or toward some other retail product. The promotion may be targeted toward a gift card recipient in some implementations. Features of the card, including a value, recipient, type, restrictions, and associated retailer may have been recognized by, for example, augmented reality module 109 and feature detection module 110. The promotion may present retail products for which the card can be redeemed. For example, the promotion may present retail products with a price equal to or less than a remaining value on the card. The promotion may be pushed from, for example, purchase and inventory server 300 to module 113 on user interface device 113, and presented by augmented reality module 109 on user presentation device 105. In some implementations, the marketing information may present rewards or other incentives based on a level of shopping activity from the user. For example, operation 1211 may include determining from the database whether the user has viewed over a threshold number of retail products at a retailer, and may include displaying a virtual coupon or other discount if the threshold number has been exceeded.

Figure 9:
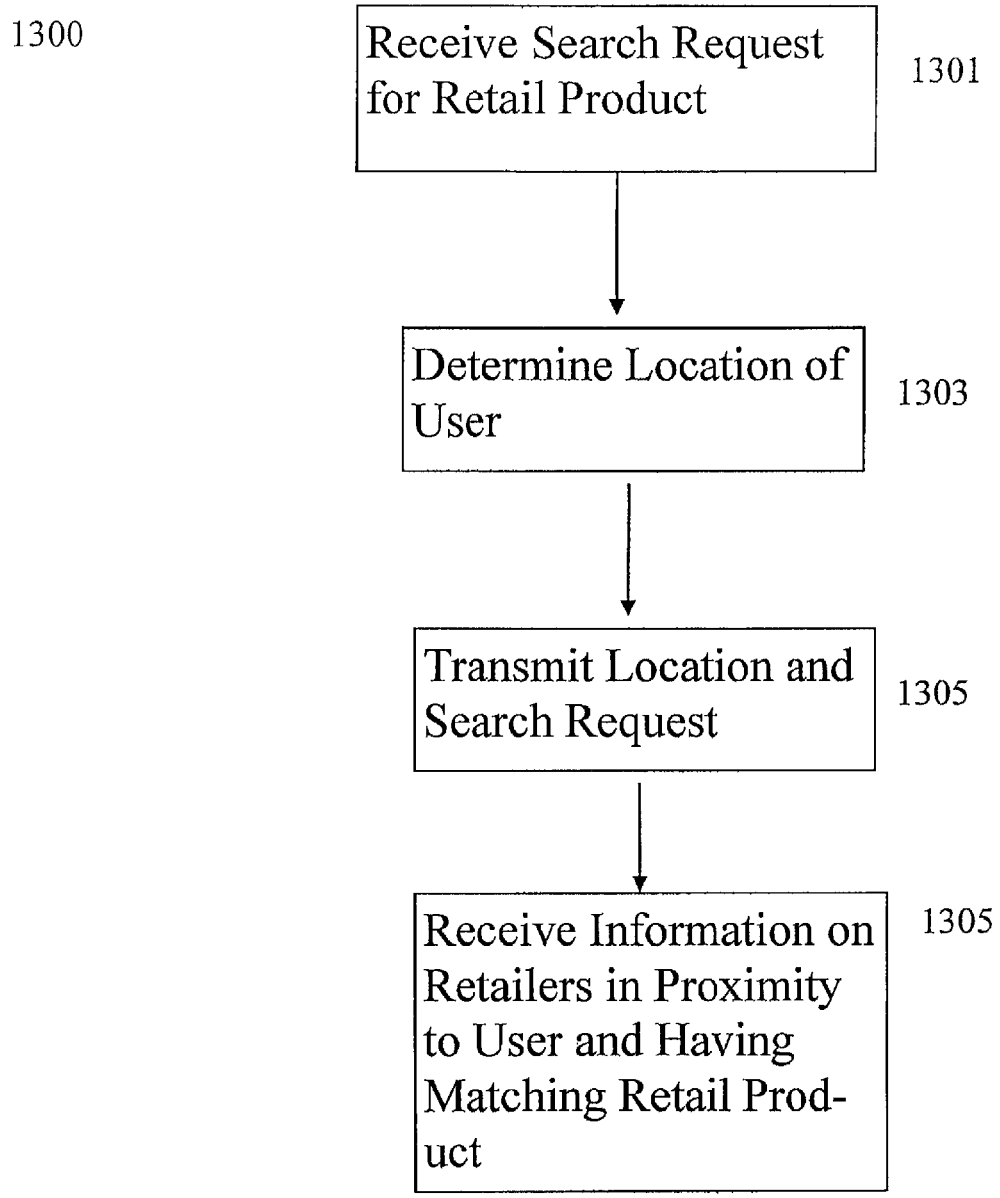
FIG. 9 illustrates an example method for presenting location-based retail information.

According to an aspect of the invention, FIG. 9 illustrates a method 1300 for presenting location-based retail information. One or more operations of method 1300 may be performed by search module 117 or another module. Location-based retail information may indicate, for example, which stores have a retail product that satisfies one or more features sought by a user. The information may further indicate only stores that are within proximity to the user. The user may thus submit a user search request, such as on his or her mobile device, and be notified on the mobile device of one or more nearby stores that satisfy the search request. At operation 1301, a search request for the sought retail product may be received, such as through a touch screen or keyboard. The search request may include a category or name of a retail product sought by the user, or a brand, price, color, size, condition, or earliest available date sought by the user. In one example, a search request may indicate that a black dress having a specified size and price range is desired by the user.

At operation 1303, a location of the user may be determined. For example, if the user inputted the request through user interface device 100, location tracking device 106 may be used to determine the user's location. In some implementations, a RFID, Bluetooth®, or other receiver may be used. The determined location may be a geographic location or may be a location within a mall, a store in the mall, or a shopping strip.

In some implementations, the search request may be processed locally, such as on user interface device 100. In some implementations, the search request may be transmitted to a server for processing. For example, at operation 1305, the user's location and search request may be transmitted by module 117 to one or more servers, such as transaction and inventory server 300. In the example, if inventory information stored on transaction and inventory server 300 is divided based on store locations, transaction and inventory server 300 may use the inventory information to determine which stores within proximity of the user has a retail product that matches the user's search request. A store may be within proximity if it is in a same building as the user or if it is within a threshold (e.g., 10 yards, 100 yards, 1 mile, or within a certain number of highway exits) distance from the user. At operation 1305, a result of the search, including a list of one or more retailers that are in proximity to the user and that satisfy the user's search request, may be received from the one or more servers. The results may be presented as part of an augmented-reality-enhanced. For example, a list of two stores having the black dress sought at operation 1301 may be presented. The list may be sorted based on proximity to the user, on price, ratings, on closing time, or any other feature.

Implementations of the invention may be made in hardware, firmware, software, or any suitable combination thereof. The invention may also be implemented as instructions stored on a machine-readable medium that can be read and executed on one or more processing devices. For example, the machine-readable medium may include various mechanisms that can store and transmit information that can be read on the processing devices or other machines (e.g., read only memory, random access memory, magnetic disk storage media, optical storage media, flash memory devices, or any other storage or non-transitory media that can suitably store and transmit machine-readable information). Furthermore, although firmware, software, routines, or instructions may be described in the above disclosure with respect to certain exemplary aspects and implementations performing certain actions or operations, it will be apparent that such descriptions are merely for the sake of convenience and that such actions or operations in fact result from processing devices, computing devices, processors, controllers, or other hardware executing the firmware, software, routines, or instructions. Moreover, to the extent that the above disclosure describes executing or performing certain operations or actions in a particular order or sequence, such descriptions are exemplary only and such operations or actions may be performed or executed in any suitable order or sequence.

Furthermore, aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the invention, and the specification and drawings should therefore be regarded as exemplary only, with the scope of the invention determined solely by the appended claims.

I claim:

1. A method of facilitating an augmented reality presentation of retail products, the method being implemented on a device that includes one or more processors executing one or more computer program modules corresponding to an augmented reality application which, when executed, perform the method, the method comprising:

receiving, by the augmented reality application from an image capture unit of the device, an image of a retail item;

detecting, by the augmented reality application, a triggering feature in the image, wherein the triggering feature includes a depiction of a retail product, a unique identifier corresponding to the retail product, or text describing the retail product;

determining, by the augmented reality application, the retail product based on the triggering feature;

simultaneously presenting, by the augmented reality application on a display of the device, the image and a three-dimensional multimedia demonstration overlaid on the image and relating to the retail product based on the determination of the retail product;

receiving, by the augmented reality application, a touch input during the presentation of the multimedia demonstration;

presenting information about the retail product based on the touch input;

determining, by the augmented reality application, that a user account associated with viewing of the presentation of the information satisfies a threshold number of views of presentations of retail products associated with a retailer; and presenting, by the augmented reality application, a promotion associated with the retailer based on the determination that the user account satisfies the threshold number.

2. The method of claim 1, wherein the retail item comprises product packaging holding the retail product, a tag coupled to the retail product, a print medium showing the retail product, a bag associated with one or more retailers, or any combination thereof.

3. The method of claim 1, further comprising:
determining, by the augmented reality application, a size, color, or combination thereof associated with the retail product based on a selection indicated by the touch input,
wherein presenting the information comprises presenting the retail product in the size, color, or combination thereof.

4. The method of claim 1, wherein the retail product is a first retail product, the method further comprising:
determining, by the augmented reality application, that the first retail product and a second retail product are associated with a clothing collection,
wherein presenting the multimedia demonstration comprises presenting a multimedia demonstration relating to the first retail product and the second retail product based on the determination that the first retail product and the second retail product are associated with the clothing collection.

5. The method of claim 4, wherein determining that the first retail product and the second retail product are associated with the clothing collection comprises determining that the first retail product and the second retail product are associated with a clothing brand, and wherein presenting the multimedia demonstration comprises presenting a multimedia demonstration relating to the first retail product and the second retail product based on the determination that the first retail product and the second retail product are associated with the clothing brand.

6. The method of claim 1, wherein the retail product is a first retail product, the method further comprising:

determining, by the augmented reality application, a promotion associated with a second retail product that was previously presented by the augmented reality application, wherein the promotion was not available during the previous presentation of the second retail product; and presenting, by the augmented reality application, the promotion associated with the second retail product.

7. A method of facilitating an augmented reality presentation of retail products, the method being implemented on a device that includes one or more processors executing one or more computer program modules corresponding to an augmented reality application which, when executed, perform the method, the method comprising:

receiving, by the augmented reality application from an image capture unit, an image of a retail item;

detecting, by the augmented reality application, a triggering feature in the image;

determining, by the augmented reality application, an in-store location of the device in response to detecting the triggering feature;

determining, by the augmented reality application, a retail product type associated with the in-store location;

determining, by the augmented reality application, augmented reality content to be presented based on the retail product type, where the augmented reality content is three-dimensional;

simultaneously presenting, by the augmented reality application on a display of the device, the image and the augmented reality content overlaid on the image;

determining, by the augmented reality application, that a user account associated with viewing of the presentation of the augmented reality content satisfies a threshold number of views of presentations of content relating to a retailer; and presenting, by the augmented reality application, a promotion associated with the retailer based on the determination that the user account satisfies the threshold number.

8. The method of claim 7, wherein the presentation of the augmented reality content comprises a presentation of a three-dimensional representation of a retail product associated with the retail product type, the method further comprising:

receiving, by the augmented reality application, a touch input during the presentation of the three-dimensional representation; and rotating, by the augmented reality application, the three-dimensional representation on the display in response to the touch input.

9. The method of claim 7, wherein the presentation of the augmented reality content comprises a presentation of a three-dimensional cube, wherein a first portion of the surface is on a first side of the three-dimensional cube, wherein a second portion of the surface is on a different side of the three-dimensional cube, wherein the first side displays a first perspective view of the retail product, and wherein the second side of the multi-sided object displays a second perspective view of the retail product, the first perspective view being different than the second perspective view.

10. A non-transitory computer-readable medium having one or more instructions corresponding to an augmented reality application that, when executed by one or more processors, cause the one or more processors to:

receive, by the augmented reality application from an image capture unit communicatively coupled to the one or more processors, an image of a retail item, detect, by the augmented reality application, a triggering feature in the image, wherein the triggering feature includes a depiction of a retail product, a unique identifier corresponding to the retail product, or text describing the retail product, determine, by the augmented reality application, the retail product based on the triggering feature, simultaneously present, by the augmented reality application, the image and a three-dimensional multimedia demonstration overlaid on the image and relating to the retail product based on the determination of the retail product, receive, by the augmented reality application, a touch input during the presentation of the multimedia demonstration, presenting information about the retail product based on the touch input, determine, by the augmented reality application, that a user account associated with viewing of the presentation of the information satisfies a threshold number of views of presentations of retail products associated with a retailer, and present, by the augmented reality application, a promotion associated with the retailer based on the determination that the user account satisfies the threshold number.

11. The non-transitory computer-readable medium of claim 10, wherein the one or more instructions further cause the one or more processors to determine a size, color, or combination thereof associated with the retail product based on a selection indicated by the touch input, and wherein presenting the information comprises presenting the retail product in the size, color, or combination thereof.

12. The non-transitory computer-readable medium of claim 10, wherein the retail product is a first retail product, and wherein the one or more instructions further cause the one or more processors to:

determine, by the augmented reality application, that the first retail product and a second retail product are associated with a clothing collection, wherein presenting the multimedia demonstration comprises presenting a multimedia demonstration relating to the first retail product and the second retail product based on the determination that the first retail product and the second retail product are associated with the clothing collection.

13. The non-transitory computer-readable medium of claim 12, wherein determining that the first retail product and the second retail product are associated with the clothing collection comprises determining that the first retail product and the second retail product are associated with a clothing brand, and wherein presenting the multimedia demonstration comprises presenting a multimedia demonstration relating to the first retail product and the second retail product based on the determination that the first retail product and the second retail product are associated with the clothing brand.

14. The non-transitory computer-readable medium of claim 10, wherein the retail product is a first retail product, and wherein the one or more instructions further cause the one or more processors to:

determine, by the augmented reality application, a promotion associated with a second retail product that was previously presented by the augmented reality application, wherein the promotion was not available during the previous presentation of the second retail product, and present, by the augmented reality application, the promotion associated with the second retail product.

15. A non-transitory computer-readable medium having one or more instructions corresponding to an augmented reality application that, when executed by one or more processors, cause the one or more processors to:
- receive, by the augmented reality application from an image capture unit communicatively coupled to the one or more processors, an image of a retail item,
- detect, by the augmented reality application, a triggering feature in the image,
- determine, by the augmented reality application, an in-store location of a device having the one or more processors in response to detecting the triggering feature,
- determine, by the augmented reality application, a retail product type associated with the in-store location,
- determine, by the augmented reality application, augmented reality content to be presented based on the retail product type, where the augmented reality content is three-dimensional,
- simultaneously present, by the augmented reality application on a display communicatively coupled to the one or more processors, the image and the augmented reality content overlaid on the image,
- determine, by the augmented reality application, that a user account associated with viewing of the presentation of the augmented reality content satisfies a threshold number of views of presentations of content relating to a retailer, and
- present, by the augmented reality application, a promotion associated with the retailer based on the determination that the user account satisfies the threshold number.

16. The non-transitory computer-readable medium of claim 15, wherein the presentation of the augmented reality content comprises a presentation of a three-dimensional cube, wherein a first portion of the surface is on a first side of the three-dimensional cube, wherein a second portion of the surface is on a different side of the three-dimensional cube, wherein the first side displays a first perspective view of the retail product, and wherein the second side of the multi-sided object displays a second perspective view of the retail product, the first perspective view being different than the second perspective view.

17. The method of claim 7, further comprising:
- presenting, by the augmented reality application, a container; and
- receiving, by the augmented reality application, a touch input over an area on the display that is associated with opening of the container,
- wherein presenting the augmented reality content comprises presenting a retail product based on the touch input being over the area.

18. The method of claim 17, wherein the touch input indicates a continuous motion, the method further comprising:
- determining that the continuous motion is directed toward a particular direction with respect to the display; and
- presenting, on the display by the augmented reality application, an unraveling of the container in accordance with the particular direction, wherein the retail product is presented after the unraveling of the container.

* * * * *